US011905215B2

(12) United States Patent
Halber et al.

(10) Patent No.: US 11,905,215 B2
(45) Date of Patent: Feb. 20, 2024

(54) LOW CARBON EMISSION CONCRETE FOR WALKWAYS AND PATHS, BINDERS AND METHODS THEREOF

(71) Applicant: Anyway Solid Environmental Solutions Ltd., Kefar Truman (IL)

(72) Inventors: Zeev Halber, Tel-Aviv (IL); Alex Campbell, Peterborough (CA)

(73) Assignee: ANYWAY SOLID ENVIRONMENTAL SOLUTIONS LTD., Kefar Truman (IL)

(*) Notice: Subject to any disclaimer, the term of this patent is extended or adjusted under 35 U.S.C. 154(b) by 0 days.

(21) Appl. No.: 17/811,148

(22) Filed: Jul. 7, 2022

(65) Prior Publication Data

US 2023/0111008 A1    Apr. 13, 2023

Related U.S. Application Data

(63) Continuation of application No. 17/489,801, filed on Sep. 30, 2021.

(51) Int. Cl.
| | |
|---|---|
| *E01C 15/00* | (2006.01) |
| *C04B 28/14* | (2006.01) |
| *C04B 16/06* | (2006.01) |
| *C04B 18/12* | (2006.01) |
| *C04B 111/00* | (2006.01) |

(52) U.S. Cl.
CPC .......... *C04B 28/14* (2013.01); *C04B 16/0633* (2013.01); *C04B 18/12* (2013.01); *E01C 15/00* (2013.01); *C04B 2111/0075* (2013.01)

(58) Field of Classification Search
CPC ..... C04B 16/0633; C04B 28/12; C04B 28/14; C04B 2111/0075; E01C 15/00

USPC ....................................................... 404/17, 27
See application file for complete search history.

(56) References Cited

U.S. PATENT DOCUMENTS

| | | | | |
|---|---|---|---|---|
| 2,937,581 | A * | 5/1960 | Havelin | E01C 3/04 404/76 |
| 3,230,103 | A * | 1/1966 | Minnick | C04B 28/18 106/287.35 |
| 3,879,214 | A * | 4/1975 | Lowe | C04B 18/023 106/443 |
| 5,145,285 | A * | 9/1992 | Fox | E02D 3/08 106/900 |
| 5,707,179 | A * | 1/1998 | Bruckelmyer | B28B 7/18 165/45 |
| 8,470,275 | B2 | 6/2013 | Constantz et al. | |
| 10,807,911 | B2 * | 10/2020 | Matsuda | C04B 14/28 |
| 2011/0103889 | A1 * | 5/2011 | Blakefield | E01C 7/36 106/793 |
| 2017/0226008 | A1 | 8/2017 | Daniellou et al. | |
| 2017/0267586 | A1 | 9/2017 | Bullerjahn et al. | |

(Continued)

FOREIGN PATENT DOCUMENTS

WO    WO2020/043751    3/2020

*Primary Examiner* — Raymond W Addie
(74) *Attorney, Agent, or Firm* — PEARL COHEN ZEDEK LATZER BARATZ LLP

(57) ABSTRACT

A reduced carbon emission concrete including a novel combination of novel binder and rock quarry waste as the aggregate. The novel binder includes cements, lime and slag. Reducing carbon emission in all stages of concrete based walkways and paths construction, starting from the materials creating the concrete through the method of construction and included elements.

19 Claims, 3 Drawing Sheets

(56) References Cited

U.S. PATENT DOCUMENTS

2018/0312440 A1 11/2018 Cappellari et al.
2020/0299203 A1* 9/2020 Sant .......................... C04B 2/02

* cited by examiner

LOW CARBON EMISSION CONCRETE FOR WALKWAYS AND PATHS, BINDERS AND METHODS THEREOF

CROSS REFERENCE TO RELATED APPLICATIONS

This application is a Continuation of, and claims priority from U.S. application Ser. No. 17/489,801, filed on Sep. 30, 2021, of which is incorporated herein by reference in its entirety.

FIELD OF THE INVENTION

The present invention generally relates to the field of low carbon emission concrete, low carbon emission cements and methods of laying out concrete.

BACKGROUND OF THE INVENTION

Concrete is one of the most widely used construction materials in the world. The $CO_2$ emissions from concrete production are directly proportional to the cement content used in the concrete mix. For example, 900 kg of $CO_2$ are emitted during production of every tonne (metric ton) of concrete, which account for 88% of the total carbon emission for concrete. In addition, the production of Ordinary Portland Cement (OPC), an essential constituent of concrete, leads to the release of significant amount of $CO_2$, a greenhouse gas. Manufacturing of OPC accounts for 8% of total global $CO_2$ emissions. One tonne (metric ton) of OPC clinker production is said to create approximately one tonne of $CO_2$ and other greenhouse gases (GHGs). With a global commitment to reduce greenhouse gases, cement and traditional concrete have been under significant pressure to adapt.

One of the most common uses of concrete is to construct rigid walkways and paths, and the concrete used is made of a gradation envelope of aggregates, sand and cement. Over and above the high carbon emissions of cement within concrete, mining of aggregates and sand also contributes to increased carbon footprint. Further, the application of concrete as walkways and paths includes additional high carbon emission components such as reinforcing metal bars (dowel bars), plastic geomembranes under the concrete layer, and toxic hydrocarbon curing compounds.

Therefore, there is a need to produce a reduced carbon emission low strength concrete for the construction of walkways and paths.

SUMMARY OF THE INVENTION

Some aspects of the present invention relate to a low carbon emission concrete mixture comprising: a hydraulic binder, an aggregate mix and water; wherein the hydraulic binder comprises: cements, lime and slag.

In some embodiments, the concrete mixture comprises 5-30% w/w hydraulic binder, 40-80% w/w aggregate mix and 5-40% w/w water.

In some embodiments, the aggregate mix includes rock quarry waste.

In some embodiments, the gradation of the aggregate mix includes: coarse sand: 9%-16% w/w, fine sand: 8%-15% w/w, silt-clay: 25%-35% w/w and clay: 13%-20% w/w.

In some embodiments, the aggregate has a fineness module of about 3.11-3.3.

In some embodiments, the hydraulic binder further comprises monofilament polypropylene fibers.

In some embodiments, the hydraulic binder comprises 30-40% w/w cements, 30-50% w/w lime and 20-30% w/w slag.

In some embodiments, the hydraulic binder comprises 30-40% w/w cements, 30-50% w/w lime, 20-30% w/w slag and 0.001-1% w/w monofilament polypropylene fibers.

In some embodiments, the cements comprise white cement and Ordinary Portland Cement (OPC).

In some embodiments, the ratio of white cement and OPC is 1:0.8.

Some aspects of the invention relate to a method of constructing a low carbon emission concrete rigid walkway, comprising: shaping, wetting and compacting of local natural ground; shaping, compacting and wetting aggregate, to produce an aggregate base layer; poring a low carbon emission concrete mixture over the aggregate base layer to produce a top layer; wherein the low carbon emission concrete mixture comprises: a hydraulic binder, an aggregate mix and water; wherein the hydraulic binder comprises: cements, lime and slag; curing the top layer to produce the low carbon emission concrete rigid walkway.

In some embodiments, the base layer is in direct contact with the top layer.

In some embodiments, the depth of the base layer is between 10-20 cm.

In some embodiments, the depth of the top layer is between 5-8 cm.

In some embodiments, the curing comprises covering the top layer with plastic sheet.

In some embodiments, the curing duration is between 48-96 hours.

Some aspects of the invention relate to a hydraulic binder comprising: cements, lime and slag.

In some embodiments, the binder further comprises monofilament polypropylene fibers.

In some embodiments, the binder comprises 30-40% w/w cements, 30-50% w/w lime and 20-30% w/w slag.

In some embodiments, the binder comprises 30-40% w/w cements, 30-50% w/w lime, 20-30% w/w slag and 0.001-1% w/w monofilament polypropylene fibers.

In some embodiments, the cements comprise white cement and Ordinary Portland Cement (OPC).

In some embodiments, the ratio of white cement and OPC is 1:0.8.

Some aspects of the invention relate to a concrete rigid walkway comprising a base layer of compacted course aggregate and a top layer comprising a concrete mixture; wherein the concrete mixture comprises a hydraulic binder, an aggregate mix and water; wherein the hydraulic binder comprises: cements, lime and slag; and wherein the base layer is in direct contact with the top layer.

In some embodiments, the depth of the base layer is between 10-20 cm.

In some embodiments, the depth of the top layer is between 5-8 cm.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
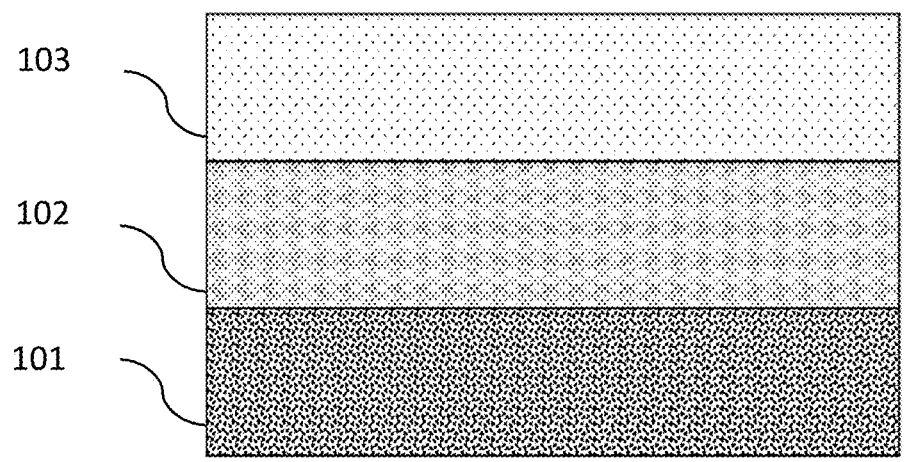
FIG. 1 is a cross section of a rigid walkway or path according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention.

However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Some embodiments of the current invention relate to a reduced carbon emission concrete comprising a novel combination of a novel binder and rock quarry waste as the aggregate. Some embodiments of the present invention further relate to reducing carbon emission in the construction method and elements of walkways and paths.

According to some embodiments the use of the binder formulation with white cement, lime and the rock query aggregate waste result in a natural-looking low carbon emission concrete surface which blends into the surrounding landscape without the use of colorants or additives.

In developing embodiments of this invention a holistic approach was taken to creating low-carbon emission concrete to be used as rigid walkways and paths. Unlike previous approaches to reducing the carbon emissions of concrete, mainly based on the reduction of Portland cement within the mix, embodiments of this invention change the ingredients in the concrete mix, aggregates and binder, while reducing elements of the application process, further contributing to the overall reduction of the carbon footprint.

In some embodiments the invention relates to a low carbon emission concrete mixture comprising: a hydraulic binder, an aggregate mix and water; wherein the hydraulic binder comprises: cements, lime and GGBFS (slag).

Typical concrete includes a mixture of: cement (7-15%), specific aggregates consisting of stones and sand (60-75%), water (14-21%) and air (up to 8%). The properties of cement can be modified based on the cement used, the type of aggregate, and the amount of air and water added.

In recent years, the approach to reducing carbon emissions from concrete has been based on the assumption that most of the carbon footprint attributed to concrete is due to the use of Ordinary Portland Cement. The aggregates used in concrete were considered to have lower contribution to the carbon footprint of concrete.

Some embodiments of the current invention relate to the production of a reduced carbon emission concrete using recycled quarry waste, reducing the amount of cement in the concrete mix, and including additional ingredients such as recycled industrial waste materials and pozzolans. In addition, the low carbon emission concrete mix according to some embodiments of the current invention, may facilitate a further reduction in carbon emission by eliminating the need to use both reinforced metal bars within the rigid slab and underlying plastic sheets (geomembranes) as part of the construction. Further, the low carbon emission concrete mix of the current invention, may harden rapidly and has a curing process that is simpler and shorter in duration compared to the usual concrete.

In some embodiments of the invention, the current invention relates to a low carbon emission concrete mixture comprising: a hydraulic binder, an aggregate mix and water. The hydraulic binder comprises: cements, lime and slag.

In some embodiments of the invention, the concrete mix comprises 5-30% w/w hydraulic binder, 40-80% w/w rock quarry aggregate mix and 5-40% w/w water.

Some embodiments of the current invention relate to an aggregate mix that includes rock quarry waste.

In some embodiments the gradation of the rock quarry waste aggregate mix includes: coarse sand: 9%-16% w/w, fine Sand: 8%-15% w/w, silt-clay: 25%-35% w/w and clay: 13%-20% w/w.

In some embodiments the rock quarry waste aggregate mix has a fineness module of between about 3.11-3.3. In some embodiments the rock quarry waste aggregate mix has a fineness module of about 3.18.

Aggregates are inert granular materials such as sand, gravel, or crushed stone, and are an essential ingredient in concrete.

Aggregates are typically divided into two categories: fine and coarse. Fine aggregates generally consist of natural sand or crushed stone wherein most particles are less than 9.55 mm in diameter. Coarse aggregates may be defined as any particles greater than 4.75 mm, and generally ranging between 9.5 mm and 37.5 mm inches in diameter.

Aggregate may be natural or manufactured. Natural gravel and sand are usually dug or dredged from a pit, river, lake, or seabed. Crushed aggregate is produced by crushing quarry rock, boulders, cobbles, or large-size gravel. With these aggregates becoming scarcer globally, the operations of their production are leading to an increase in its carbon footprint.

An aggregate gradation is the range of particle sizes in an aggregate mix. The proportions between coarse and fine aggregates will change based on the unique characteristics of each aggregate. Aggregates typically comprise 60 to 75 percent of the total volume of concrete.

The aggregate mix used in the current invention comprises rock quarry waste from aggregate processing plants which is usually discarded as the fines content and general gradation is not suitable for its traditional use within typical concrete and other processes. Using rock quarry waste as the aggregate mix, in the current invention, lowers the carbon footprint of the low carbon emission concrete.

Figure 2:
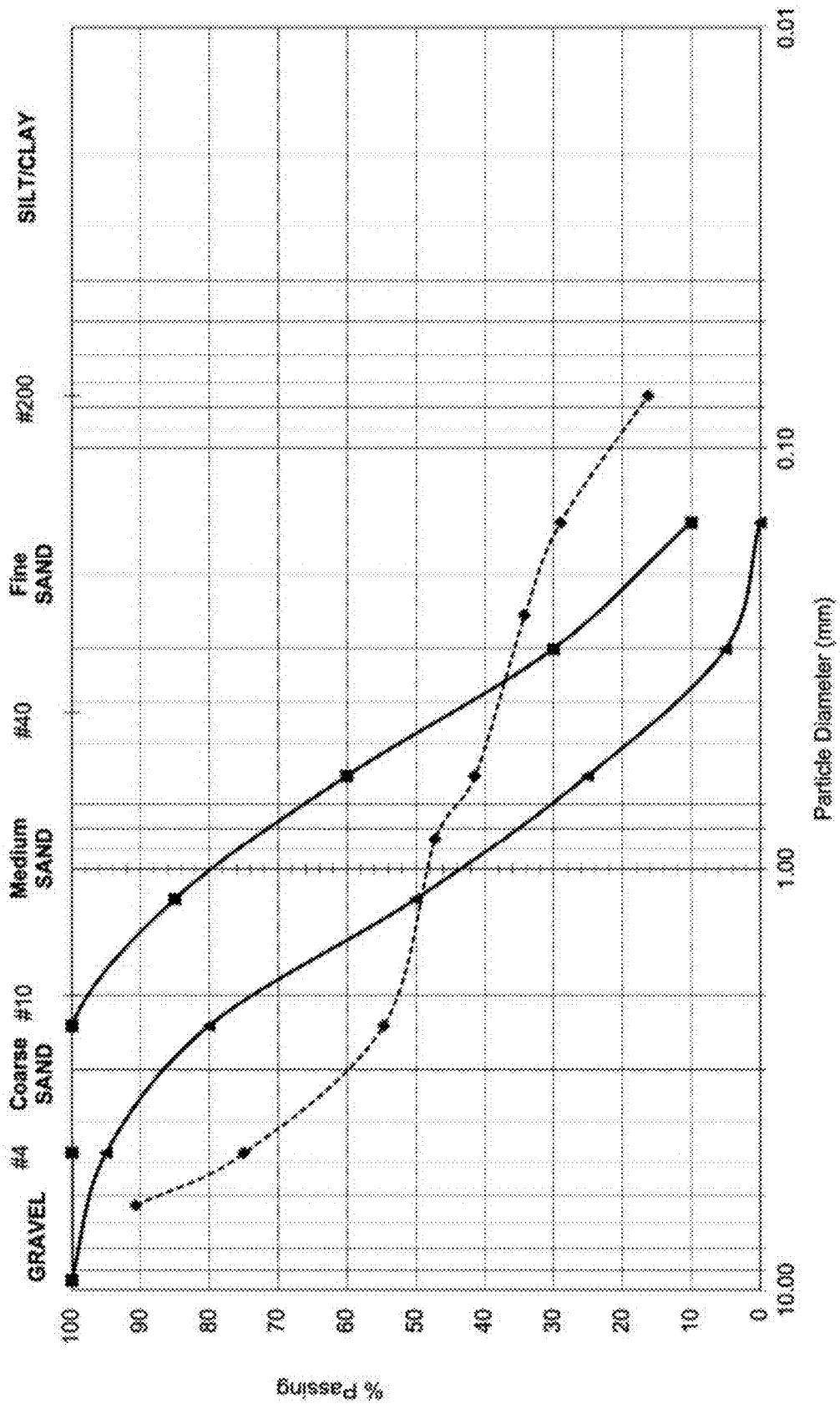
FIG. 2 is a gradation graph of prior art aggregates compared to aggregates according to an embodiment of the invention.

FIG. 2 illustrates a gradation graph of prior art aggregate compared to aggregates of the current invention. The grading tolerances for typical aggregates used in concrete are shown in full graph lines. An example gradation of the aggregates used in the current invention is shown in the dotted graph line and highlights the disparity to that of a typical concrete aggregate, both in the coarse and fine fractions.

The gradation of the aggregates mix according to some embodiments of the current invention is different from that currently used in concrete for rigid walkways/paths. This specific aggregates mix cannot be used with typical cement as it would cause excessive cracking and poor strength development.

In some embodiments of the current invention, the gradation of the rock quarry aggregate mix includes: Coarse sand: 9%-16% w/w, Fine Sand: 8%-15% w/w, Silt-clay: 25%-35% w/w, Clay: 13%-20% w/w.

In some embodiments the fineness modulus (FM) for the aggregates mix is between about 3.11-3.3. In some embodiments the fineness modulus for the aggregate mix is 3.18, which is well beyond the tolerances of aggregate used for the production of typical concrete.

The fineness modulus (FM) is an index of the fineness of an aggregate. The FM may be calculated by adding the cumulative percentages by mass retained on each of a specified series of sieves and dividing the sum by 100. The typical FM for fine aggregate should fall within the range of 2.3 to 3.1. Excessively fine materials may have a higher water demand and typically result in a sticky mix. Excessively coarse material may produce harsh mixes that are more difficult to place, consolidate, and finish. Fine particles of clay are usually not permissible to be used in typical concrete mixtures as they may lead to greater pavement cracking.

In some embodiments the binder, and its specific formulation may allow hydraulic binding of an aggregate gradation envelope which includes fine and very fine particles of clay and silts without compromising the quality of the resulting concrete.

Some embodiments of the current invention relate to a hydraulic concrete binder. In some embodiments the binder is an inorganic calcium-driven hydraulic binder.

In some embodiments the hydraulic binder comprises: cements, lime and slag.

In some embodiments the binder further comprises monofilament polypropylene fibers.

In some embodiments the hydraulic binder comprises: cements, lime, slag and monofilament polypropylene fibers.

In some embodiments the hydraulic binder comprises between about 30-40% w/w cements, 30-50% w/w lime and 20-30% w/w slag.

In some embodiments the hydraulic binder comprises about 36% w/w cements, 40% w/w lime and 24% w/w slag.

In some embodiments the hydraulic binder comprises between about 30-40% w/w cements, 30-50% w/w lime, 20-30% w/w slag and 0.001-1% w/w monofilament polypropylene fibers.

In some embodiments the hydraulic binder comprises between about 36% w/w cements, 40% w/w lime, 24% w/w slag and 0.001% w/w monofilament polypropylene fibers.

In some embodiments the cements are a mixture of white cement and Ordinary Portland Cement (abbreviated as OPC or cement).

In some embodiments the binder comprises white cement, OPC, lime, slag, and monofilament polypropylene fibers.

Ordinary Portland Cement (OPC) may include a fine powder, produced by heating limestone and clay minerals in a kiln to form clinker, grinding the clinker, and adding 2 to 3 percent of gypsum.

White cement is similar to OPC in most aspects except for its high degree of whiteness. The gray color of OPC may derive from a number of transition elements in its chemical composition. The transition elements are typically: chromium, manganese, iron, copper, vanadium, nickel and titanium. The amount of these is typically minimized in white cement.

In some embodiments the amount of cements in the binder is between about 30-40% w/w. In some embodiments the amount is about 36% w/w. In some embodiments the cement is OPC. In some embodiments the cement is white cement. In some embodiments the cement is a combination of OPC and white cement. In some embodiments the ratio of OPC and white cement is between about 4:1-1:1. In some embodiments the ratio of OPC and white cement is about 1:0.8.

In some embodiments the hydraulic binder comprises about 20% w/w white cement, 40% w/w lime, 24% w/w slag, 16% w/w OPC and 0.01% w/w monofilament polypropylene fibers.

Lime may include a calcium-containing inorganic mineral composed primarily of oxides, and hydroxide, usually calcium oxide and/or calcium hydroxide.

In some embodiments the amount of lime in the binder is between about 30-50%. In some embodiments the amount is about 40%.

Slag may include a pozzolan substance formed when granulated blast furnace slag (BFS) is grinded to suitable fineness to create GGBFS.

In some embodiments the amount of slag in the binder is between about 20-30%. In some embodiments the amount is about 24%.

Monofilament polypropylene fibers may be about 10-13 mm long and may have a diameter of about 0.18 μm.

In some embodiments the amount of monofilament polypropylene fibers in the binder is between about 0.001% to 1% of weight of the hydraulic binder. In some embodiments the amount is about 0.1%.

In some embodiments the binder comprises: 20-28% w/w Tri-calcium silicate (C3S; $3CaO \cdot SiO2$), 6%-18% w/w Di-calcium silicate (C2S; $2CaO \cdot SiO2$), 2%-4% w/w Tri-calcium aluminate (C3A; $3CaO \cdot Al2O3$), 2%-6% w/w Tetracalcium aluminoferrite (C4AF; $4CaO \cdot Al2O3 \cdot Fe2O3$), 40% w/w Calcium hydroxide ($Ca(OH)_2$), 7.1% w/w SiO2, 2.6% w/w Al2O3, 8.0% w/w CaO, 1.6% w/w MgO and 0.001-1% w/w monofilament fiber.

Some embodiments of the current invention relate to a low carbon emission concrete mixture comprising: the hydraulic binder, aggregate mix and water.

Some embodiments of the current invention relate to a low carbon emission concrete mixture comprising: the hydraulic binder, the rock quarry aggregate mix and water.

In some embodiments the concrete components are mixed thoroughly for between about 10-30 minutes.

In some embodiments the concrete components are mixed thoroughly for about 20 minutes.

In some embodiments, when creating the low carbon emission concrete mix, the water is the first component added.

In addition to reducing the carbon emissions through the changes made to the concrete ingredients, as described in the above embodiments, some embodiments of the current invention include changes to the construction process of rigid walkways and paths in order to further reduce the total carbon footprint of the rigid walkways and paths.

FIG. 1 is a cross section of a rigid walkway or path according to an embodiment of the invention. As illustrated in FIG. 1, in some embodiments base layer 102 is in direct contact with the ground 101, and top layer 103 is in direct contact with base layer 102. In some embodiments top layer 103 does not comprise metal reinforcements.

Figure 3:
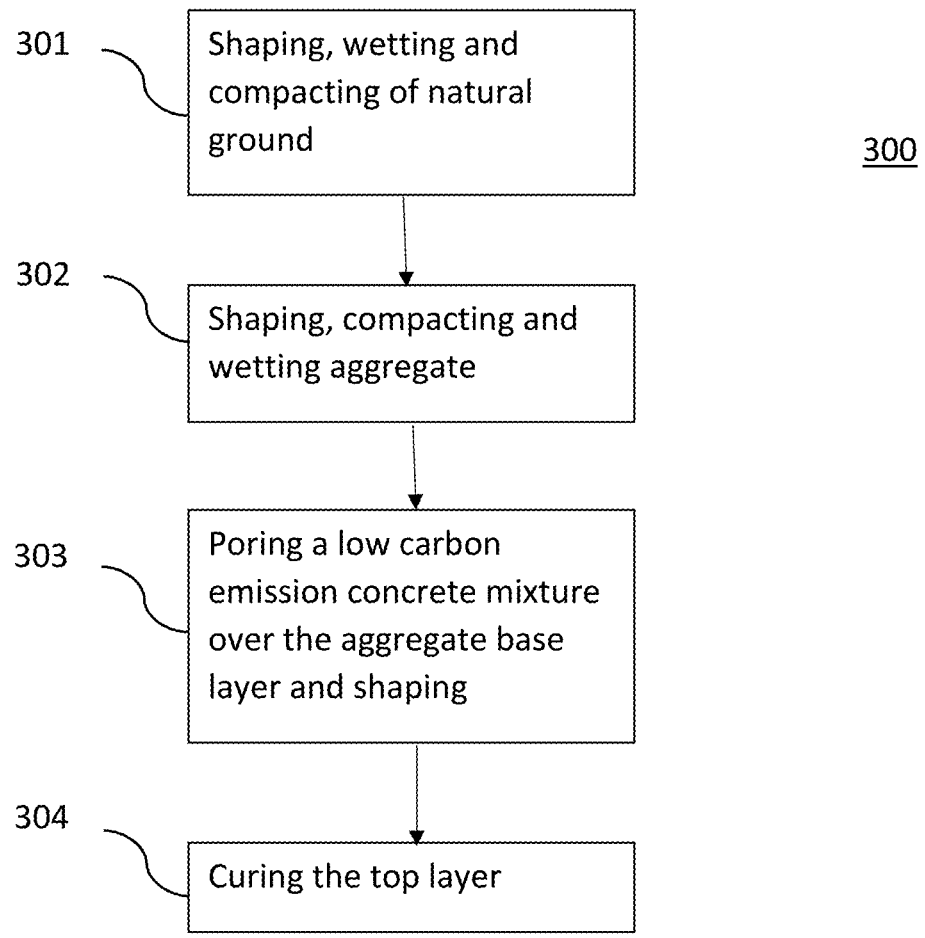
FIG. 3 is a high-level flow chart of a method of preparing a rigid walkway or path according to an embodiment of the invention.

FIG. 3 is a high-level flowchart illustrating methods 300, according to some embodiments of the invention. Method 300 of constructing a low carbon emission concrete rigid walkways and paths, may comprise: shaping and compacting of the local natural ground 301; shaping, compacting and wetting aggregate to produce an aggregate base layer 302; poring low carbon emission concrete over the aggregate base layer to produce a top layer 303; the low carbon emission concrete mixture comprising: a hydraulic binder, an aggregate mix and water; and the hydraulic binder comprising: cements, lime and slag; curing the top layer 304 to produce the low carbon emission concrete rigid walkway.

In some embodiments the base layer is in direct contact with the low carbon emission concrete top layer.

In some embodiments method 300 of constructing a low carbon emission concrete rigid walkway, comprises: shaping, wetting and compacting of local natural ground 301; compacting and wetting aggregate 302 to produce an aggregate base layer; poring the low carbon emission concrete directly over the aggregate base layer 303 to produce a top layer; the low carbon emission concrete mixture comprising: a hydraulic binder, an aggregate mix and water; and the hydraulic binder comprising: cements, lime and slag; curing the top layer 304 to produce the low carbon emission concrete rigid walkway.

The base layer, in a concrete rigid walkway or path, is typically constructed with course aggregates and compacted to minimum 98% of MOD AASHTO. The typical designs of rigid walkways and paths made of concrete constructed on compacted base course specify a base course layer of a minimum of 20 cm.

In some embodiments the base layer aggregate is typical base course aggregate mix.

In some embodiments the base layer aggregate includes rock quarry waste aggregate.

In some embodiments the depth of the base layer is between 10-20 cm. In some embodiments the depth of the base layer is 20 cm. In some embodiments the depth of the base layer is 15 cm. In some embodiments the depth of the base layer is 10 cm.

According to some embodiments the novel combination of a novel binder and rock quarry waste aggregate enables a shallower depth base layer.

Typically, concrete slabs, walkways or paths require specific preliminary procedures prior to pouring of the concrete slurry. A plastic sheet or membrane is placed over the base aggregate layer. This is used to prevent leaching of moisture and fines from the base layer into the concrete slurry, causing the rapid development of cracks. In addition, a metal skeleton of re-bar is placed where the concrete slurry will be poured to act as an internal cage to further resist shrinkage cracking in the concrete.

According to some embodiments the current novel combination of a novel binder and rock quarry waste aggregate eliminates the need for both the plastic sheet and the re-bar and enable a shallower depth base layer.

According to some embodiments the fiber content, of the binder, allows for a link between the inter-particle matrix (the microscopic level, or micro) to the larger, macroscopic aggregate framework (or the macro). This micro-macro linkage adds tensile strength to the system, which reduces the shrinkage cracking potential and contributes to dissipating the load during its service life and thus eliminates the need for re-bar and enables a shallower depth base layer and a shallower depth top layer.

In this application "reinforced concrete" refers to concrete with re-bar.

In this application "low carbon emission concrete" refers to concrete without re-bar.

According to some embodiments the chemical reactions (detailed below) between the novel binder and the rock quarry waste aggregate increase the water retention and small particle retention of the concreate and accordingly eliminate the need for the plastic sheet over the base layer.

In typical concrete path construction, after preparing the aggregate base layer, concrete is poured over the plastic sheet to a typical depth of 12-20 cm.

In some embodiments the depth of the top layer is between 5-8 cm. In some embodiments the depth of the top layer is about 5 cm. In some embodiments the depth of the top layer is about 6 cm. In some embodiments the depth of the top layer is about 7 cm. In some embodiments the depth of the top layer is about 8 cm.

In some embodiments after laying the concrete the surface is worked and formed. In some embodiments the surface is also brushed or broomed to add texture.

In typical path construction, after laying the concrete it requires careful steps to ensure that it hydrates or cures uniformly. Concrete hydration and curing may be an exothermic process. This heat drives off water needed for the hydration process, thereby compromising the strength propagation of the concrete system. To prevent this, it is common practice for toxic curing compounds to be sprayed on the surface to limit the heat of hydration and loss of moisture from the system. This regulates and slows the hydration process.

As previously noted, according to some embodiments, the chemical reactions between the novel binder and the rock quarry waste aggregate increase the water retention and accordingly there is no need for toxic curing compounds and the curing duration is shorter.

In some embodiments the curing comprises covering the top layer. According to some embodiments the cover may be any suitable material such as a plastic sheet or a geomembranes.

In some embodiments the curing duration is between about 48-96 hours. In some embodiments the curing duration is about 48 hours. In some embodiments the curing duration is about 72 hours. In some embodiments the curing duration is about 96 hours.

In some embodiments after the curing is completed the cover is removed and the walkway is ready to be used. In some embodiments it may be used by pedestrians and/or light traffic.

According to some embodiments the use of the binder formulation with white cement, lime and the rock query aggregate waste result in a natural-looking low carbon emission concrete surface which blends into the surrounding landscape without the use of colorants or additives.

In developing embodiments of this invention a holistic approach was taken to creating low-carbon emission concrete to be used as rigid walkways and paths. Unlike previous approaches to reducing the carbon emissions of concrete, mainly based on the reduction of Portland cement within the mix, embodiments of this invention change the ingredients in the concrete mix, aggregates and binder, while reducing elements of the application process, further contributing to the overall reduction of the carbon footprint.

According to some embodiments some of the advantages of the current invention include:
1. Reducing the amount of Ordinary Portland Cement to less than 2% of the total concrete mix.
2. Replacing high-carbon footprint materials in the binder with industrial waste materials in the form of GGBFS as pozzolan.
3. Introducing the use of calcium oxides to widen the chemical reactions to address the presence of fine clay and silts.
4. Introducing monofilament fibers as part of the binder to reduce the shrinkage cracking potential and dissipate load during its service life.
5. Using recycled waste quarry aggregates to further reduce the carbon footprint of the concrete mix. By doing so, permitting the use of fine silt and clay particles within the aggregates mix and the use of materials with a FM greater than 3.1.
6. Further reducing the carbon footprint by eliminating the need to place plastic membranes to cover the base layer before pouring of the concrete.
7. Further reducing the carbon footprint by eliminating the need for reinforcement of the layer with metal mesh or rebar.
8. Further reducing the carbon footprint by allowing the application of this innovative concrete as rigid walkways/paths to be applied in layers of 5-8 cm, compared to the 12-20 cm of concrete in typical designs currently used worldwide.
9. Shortening the curing period of the concrete to only 48-96-hours after which the constructed walkway/path can be open for use, and eliminating the need to use chemicals as part of the curing process.

The specific formulation of the low carbon emission concrete according to some embodiments of the invention allows for each of the individual components to contribute to the reaction process, but also permits them to act holistically in contributing to the hydraulic binding process. Each component contained in the binder may have its own series of reactions that occur at varying rates, which can be broken down into initial, short term and long term reactions. Due to the phases contained in the hydraulic binder, there may be a considerable rise in the pH of the system, which is required to activate the chemistry of the system. This increase in soil pH may activates the pH-dependent sites on the surfaces and edges of the fine fraction of the aggregate. This also may provide a key site for creating links between the micro and macro structure of the system. Development of interparticle bonds may cause agglomeration of the fine aggregate particles. The 'aggregation' of the fine fraction may lead to stability within the layer. Following aggregation, medium to long term reactions may begin and secondary reaction products may form.

Concrete suppliers and applicators typically strive to use well-graded, low plasticity aggregates to produce a given concrete. Within any construction material, the gravel, sand, silt, and clay particles have a significant influence on the strength properties of that material. However, the clay fraction often has the biggest influence on aggregates mix behavior, and is usually the most important fraction when considering a mix activity and inorganic reactions. A number of aggregates mix reactivity components need to be considered as background when considering the addition of binder to create concrete. These include ion exchange, flocculation and agglomeration, pozzolanic reactions, and mineral weathering process.

Reaction Process of Embodiments of the Current Invention

The binder/aggregate mix reaction process and the reaction products produced according to embodiments of the invention are highly complex. While many of the reaction products are minor, they still contribute to the strength gaining properties of the hydrating system. The presence of each phase is governed by the rate of reaction, which relies on many factors, including application rate, temperature, and mineralogy. The important components to the reactivity of the binder include the aggregate mix, $Ca(OH)_2$, $C_2S$, $C_3S$, CSH, and CAH. Each has a unique contribution to the stability and durability of the pavement layer.

The hydraulic binding of a mix of aggregates which includes fine plastic particles and non-plastic particles can be explained by the process of a few underlying mechanisms. The primary products harden into a high strength 'aggregate' and differ from normally hydrated cement in that their calcium content is lower. The secondary processes enhance the strength and stability of aggregate-binder mix by producing additional cementitious matter which increases interparticle bond strength and ultimately the load bearing capacity.

The binder hydration reactions in the low carbon emission concrete of some embodiments of the invention, can be summarized as follows:

After mixing the binder with the aggregates mix, addition of water initiates the hydration of all the binder components;

Phase dissolution creates excess calcium ions and hydroxide ions, which are key components in the reaction process;

Hydroxide ions increase the pH of the soil solution, activating the pH dependent sites on clays;

Calcium ions interact with exchangeable and pH-dependent sites on clays, forming bridging contact points for inter-particle growth;

The increase in divalent cations in the aggregates mix solution causes flocculation and agglomeration of the clay fraction in the mix. A decrease in plasticity index and increase in load bearing capacity due to entropy occurs;

Increased pH causes dissolution of aluminum and silicon species from the mix particles and binder species;

Complex calcium compounds form from nucleation sites to cast the aggregates mix particles into an interconnected matrix;

Interaction between the hydrating binder paste and calcium, aluminum, and silicon in solution form complex CAH's and CSH's;

Complex calcium-aluminate, calcium-silicate, and calcium-aluminosilicates form the basis of the inter-particle matrix of the aggregates mix allowing for further reaction processes to proceed. A significant increase in the bearing capacity, shear strength, and tensile strength is achieved;

Pozzolanic components contained in the binder continue to hydrate as a consequence of gel presence within the pore spaces of the system; and Long-term strength increases are observed up to one year, highlighting the significant contribution of pozzolanic reactions to layer integrity.

General Reaction of Embodiments the Current Invention

According to some embodiments the binder is mixed into the aggregates mix as a dry powder, without exception. There may be localized hydration initiation where water within the aggregates mix is present, although this will not compromise structural integrity. Thorough mixing of the binder with the aggregates mix and water is a very important step in the process to obtain even distribution throughout the mix. This will ensure that the hydration reactions occur uniformly and that strength gain is consistent throughout the final casted top layer to prevent areas of weakness.

Initial reactions involve the process of hydration of phases contained in the binder and the interaction of these components with the aggregates mix under a moist environment. These reactions are principally exothermic and include dissolution of alkalis with subsequent pH increase, which promotes ion exchange. Cation exchange allows inter-particle bridges to form from secondary minerals that proceed to further catalyze reaction products through pozzolanic processes. Initial reactions proceed immediately from the time of moisture contact and proceed for the first few hours after hydration. The rates of reaction are extremely rapid and consequently the initial reaction time frame is based on hydration initiation to the point at which complex secondary minerals start to precipitate from the reaction process.

Many of the phases contained in the binder will begin hydration at the same time, but react at different rates. These varying rates of reaction and the associated reaction pathways involved in the hydration of the binder address the complex and variable composition of the aggregates mix, allowing for a the inclusion of fine and very fine particles in the mix. Despite the variety of components, calcium remains the common variable in the binder phases. As calcium silicates, calcium aluminates, calcium aluminosilicates and calcium sulphates hydrate, calcium ions are released into the pore fluid. This is explained in the following equations:

$$(CaO)_x(SiO_2)_y + H_2O \rightarrow Ca_xSi_y(OH)_z + Ca(OH)_2$$

$$Ca(OH)_2 \rightarrow Ca^{2+} + 2OH$$

This basic reaction is the catalyst for further reactions, while the calcium ($Ca^{2+}$) and hydroxide ($OH^-$) reactants are the key components in the binding process. During the hydration of the binder phases, there is sufficient solubilization of calcium hydroxide ($Ca(OH)_2$) and other alkalis (sodium and potassium) to raise the pH to over 12.5. The calcium hydroxide formed during this period is more reactive than the lime contained in binder as a phase component, as the secondary lime is in a more reactive hydrated form. This contributes to a significant increase in the pore water pH, which is critical to primary mineral dissolution, both within the binder and the aggregates mix.

At such high alkalinity, dissolution of layer aluminosilicates and other siliceous and aluminous material occurs. Contributions of secondary mineral building blocks, principally silica and alumina, occur as a result of the dissolution of aggregates mix phases in addition to the binder.

Plastic Particles in the Aggregates Mix

Calcium exchange initiates the binding process very quickly. As calcium ions are released into the pore fluid, they become available for interacting with the surrounding clay in the mix (and other exchangeable sites within the mix). Calcium ions are adsorbed by clay particles and by components within the binder that require activation and convert them to the calcium form. The adsorption rate slows down upon initial adsorption of calcium ions by the clay as it becomes increasingly diffusion dependent. When such conditions prevail, and depending on the rate of supply of calcium by the hydrating binder particles, calcium ion concentration may rise locally to a level high enough to cause precipitation of calcium hydroxide.

However, even distribution of the binder throughout the aggregates mix will minimize the opportunity of calcium hydroxide crystals to grow and as a result they remain in the form of very fine particles of pure hydrated lime. The presence of lime and calcium ions in solution causes a double layer to be formed at the surfaces of clays where monovalent cations are readily exchanged with divalent calcium ions, serving as a starting point for flocculation and bond formation.

The higher charge density of divalent ions during ion exchange results in a significant reduction of the double layer thickness. Flocculation of clay in the aggregates mix forms coatings or skins on the mixed aggregate surfaces promoting coherence of sand and silt particles, which have little surface activity and enhance the formation of clay aggregates as cementing agents. This results in a consequent reduction in the plasticity index and an increase in shear strength (due to entropy), all contributing to enhanced structure formation. The considerable increase in the soil pH will activate the pH-dependent sites on the surfaces and edges of clay particles.

Divalent cations, predominantly calcium, will incorporate themselves into the clay structure, providing an induction point for other clay particles to create bridging covalent bonds and in so doing, forming insoluble calcium silicates and a starting point for aluminosilicate bridges. Due to the cation effect, calcium is a difficult ion to replace on the exchangeable sites of clay and, therefore, will remain in the clay structure providing a key site for combining with other particles within the mix and creating a link between the micro- and macro-structure of the soil. Thin, short, polymeric fibers included in the binder formulation do not contribute directly to the reaction processes, but enhance the linking of the microphase of the system into the greater macro system, imparting a degree of flexibility and significantly improving the tensile strength.

Primary cementitious materials are formed by the hydration reactions and are composed of hydrated calcium silicates ($C_2SH_x$, $C_3S_2H_x$), calcium aluminates ($C_xAH_y$), and hydrated lime.

$$Ca_xSi_yO_z + H_2O \rightarrow Ca_xSi_y(OH)_z + Ca(OH)_2$$

$Ca_xSi_y(OH)_z$ is analogous to that produced during alite and belite hydration in Portland cement reactions:

$$2Ca_3SiO_5 + 6H_2O \rightarrow Ca_3Si_2O_7 \cdot 3H_2O + 3Ca(OH)_2$$

$$2Ca_2SiO_4 + 4H_2O \rightarrow Ca_3Si_2O_7 \cdot 3H_2O + Ca(OH)_2$$

Three fundamental calcium aluminum hydrates, excluding those containing sulphur (e.g. ettringite), are formed during the binder hydration:

$$(CaO)_x(Al_2O_3)_y + H_2O \rightarrow CAH_{10} \; [CaAl_2O_4 \cdot 10H_2O]$$

$$(CaO)_x(Al_2O_3)_y + H_2O \rightarrow C_2AH_8 \; [(Ca_2Al_2O_5 \cdot 8H_2O]$$

$$(CaO)_x(Al_2O_3)_y + H_2O \rightarrow C_3AH_6 \; [(Ca_3Al_2O_6 \cdot 6H_2O]$$

Hydroxides react with silica derived from clayey soils at the high pH created during the hydration process. This reaction results in the production of tough, water insoluble CSH and CAH gels in the matrix:

$$Ca(OH)_2 + SiO_2 \rightarrow C_xS_yH_z$$

$$Ca(OH)_2 + Al_2O_3 \rightarrow C_xA_yH_z$$

The formation of these additional cementing materials may require the solubilization of silica and alumina from the aggregates mix components. A significant contribution is also provided from the binder components. The solubility and reactivity of the silica and alumina are increased in the elevated pH conditions that prevail in the binder-aggregates mix system. At this high pH level, the system is supersaturated with respect to alumina and silica, which favors precipitation of aluminosilicates, which have a crumpled chemistry that differs from the sheet chemistry of clays.

Calcium adsorbed on clay surfaces will react with adjacent clay surfaces, leading to agglomeration:

$$Ca^{2+} + Na^+\text{—clay—} \rightarrow Na^+ + Ca^{2+}\text{—clay-}$$

The calcium silicate and calcium aluminate fibrils formed from calcium exchange during initial hydration on clay particles connect, link the small aggregate clays to larger less reactive mix particles. Interlocking of these fibrils as hydration proceeds eventually binds the cementation products and other compounds of the mix into a hard mass.

Non-Plastic Particles in the Aggregates Mix

The contribution of alumina and silicate from the mix particles other than phyllosilicates is an important aspect of the ability to bind non-plastic particles within the aggregates mix used for the creation of the binder. The degree of alkalinity contained in a hydrating binder-aggregates mix system is such that dissolution of silica and alumina is favorable. The dissolution products combined with the calcium silicates, calcium aluminates, and calcium aluminosilicate chemistry donated by hydrating the binder to allow for complex CSH and CAH reaction products to form in addition to those created by the clay fraction in the mix.

The CSH and CAH form part of the inter-particle matrix that contributes to improved volume stability and increased load bearing capacity. The creation of the inter-particle framework that is interwoven with the mix particles, secondary minerals, hydrating the binder grains, and pozzolanic materials, provides a base for further reactions to proceed in the pore spaces, and in so doing further densifying the system. Continued (up to 12 months) formation of aluminosilicates in the remaining small pore spaces, limiting the effect of evaporation and promoting the formation of gels that permit complex long-term reactions to continue. The silicate gel proceeds immediately to coat and bind clay lumps in the mix and to further close possible voids. This gel gradually crystallizes into well-defined calcium silicate hydrates, such as those analogous to tobermorite and hillebrandite reactions.

$$5Ca(OH)_2(aq) + 6SiO_2(aq) \rightarrow Ca_5(OH)_2Si_6 \cdot 4H_2O \text{ (Tobermorite)}$$

$$SiO_2(aq) + 2Ca(OH)_2(aq) \rightarrow Ca_2SiO_3(OH)_2 \cdot XH_2O \text{ (Hillebrandite)}$$

Long term reactions are mainly associated with the reaction of $C_xS_y$ and pozzolanic calcium aluminosilicates. Formation of complex CSH is associated with these reactions and is the primary agent of long-term strength gain. Secondary pozzolanic reactions between the calcium hydroxide released during hydration and soil alumina and soil silica occur and are an important aspect of the binder hydraulic binding process, resulting in significantly reduced permeability and long term integrity of the system.

$$Pozz + H_2O + Ca(OH)_2 \rightarrow C_xS_yH_z$$

$$Pozz + H_2O + Ca(OH)_2 \rightarrow C_xA_yH_z$$

$$Pozz + H_2O + Ca(OH)_2 \rightarrow CASH$$

In the binder mix, there will always be additional calcium oxide to silicon dioxide ratios and as a result secondary mineral formation.

Hydrotalcite ($Mg_6Al_2(CO_3)(OH)_{16} \cdot 4H_2O$), a magnesium aluminate hydroxy hydrate and gehlenite hydrate ($C_2ASH_8$) are commonly found in the binder pastes, along with ettringite ($Ca_6Al_2O_6(SO_4)_3 \cdot 32H_2O$), monosulphate and CSH. Hydrogarnet (nominally $C_3AH_6$, but in practice containing iron and silica), is also a common phase. When a diffusing alumina: silica species or calcium:alumina:silica species interact with either a solid or diffusing calcium hydroxide, there is also a potential for strallingite formation.

$$2Ca(OH)_2 + Al_2O_3 \cdot SiO_2 + 6H_2O \rightarrow Ca_2Al_2(SiO_2)(OH)_{10} \cdot 2.5H_2O$$

$$Ca_9Al_2O_3(SiO_2)_2 + Ca_3Al_2O_5 + 16H_2O \rightarrow 2Ca_2Al_2(SiO_2)(OH)_{10} \cdot 2.5H_2O$$

EXAMPLES

Example 1—Testing Quarry Materials

Materials
1. Two materials were tested, both supplied by the same quarry:
   i. Quarry Sand—

|  | Sieve (in mm) | | | | | | | | | |
| --- | --- | --- | --- | --- | --- | --- | --- | --- | --- | --- |
|  | 4.75 | 2.36 | 2.00 | 1.18 | 0.60 | 0.425 | 0.30 | 0.18 | 0.15 | 0.075 |
| Weight Passing % | 100 | 79.8 | 75.6 | 60.1 | 45.0 | 42.2 | 36.9 | 30.7 | 26.6 | 21 | ii. Quarry waste:

|  | Sieve (in mm) | | | | | | | | |
| --- | --- | --- | --- | --- | --- | --- | --- | --- | --- |
|  | 50 | 37.5 | 25.0 | 19 | 9.5 | 4.75 | 2.36 | 2.0 | 0.425 | 0.075 |
| Weight Passing % |  | 100 | 89 | 71 |  |  | 63 | 51 |  | 33 |

2. Three types of binder mixes were used:
   i. Binder 1: Calcined Gypsum (50%), Lime (25%), OPC (11%), GGBFS (14%), Polypropylene fibers (0.1%), Malic Acid (0.1%).

ii. Binder 2: Calcined Gypsum (20%), Lime (40%), OPC (20%), GGBFS (20%), Polypropylene fibers (0.1%), Malic Acid (0.04%), Homopolymer (1.0%).
iii. Binder 3: Lime (40%); White Cement (20%); OPC (16%); GGBFS (24%); Polypropylene fibers (0.1%).

Mixtures Ratios and Process
1. Each of the quarry materials was mixed with each of the binders separately at a ratio of 1:4 based on volume, using small rubber open containers.
2. The dry mixture was well mixed by hand using a concrete trowel and then water was added and mixed until the mix was smooth and 'runny' (like concrete). The amount of water added to the mix was recorded.
3. The mix was then put into concrete testing molds and left for curing.
4. The cubes, in the molds, were cured in plastic bag for 4 days and then left in open air at room temperature for additional 3 days.
5. The molds were open on the $7^{th}$ day.
6. One cube was tested on the same day (7) for strength and the others were left in room temperature (out of the molds) for additional 21 days and crushed at 28 days.
7. The cubes were crushed under load as per ASTM: D 1633-00, *Standard Test Methods for Compressive Strength of Molded Soil-Cement Cylinders*. The load was set to a constant rate within the limits of 20+10 psi (140+70 kPa)/s.
8. The prepared specimens and strength tests results are presented in Table 1:

TABLE 1

| Number of specimen | Stabilized material | Binder | Added water (in ml) | 7 days strength MPa | 28 days strength MPa |
| --- | --- | --- | --- | --- | --- |
| 1 | Quarry Sand | Binder 1 | 736 | 0.526 | 2.082 |
| 2 | Quarry Waste | Binder 1 | 660 | 2.4 | 1.8 |
| 3 | Quarry Sand | Binder 3 | 989 | 1.03 | 1.8826 |
| 4 | Quarry Waste | Binder 3 | 1068 | 1.503 | 2.339 |
| 5 | Quarry Sand | Binder 2 | 766 | 0.573 | 1.036 |
| 6 | Quarry Waste | Binder 2 | 1000 | 0.742 | 1.535 |

As can be seen from the table, the best combination, in terms of producing the highest strength, is quarry waste and binder 3.

Example 2—Preparation of Low Carbon Emission Concrete and Application Method

Equipment Used:
1. Wooden frames of 2X1 meters for each of the samples—In total 18 samples of various height: 3 of 5 cm, 3 of 7.5 cm and 3 of 10 cm.
2. Quarry waste as per design was imported from a nearby quarry:

| | Sieve (in mm) | | | | | | | | |
| --- | --- | --- | --- | --- | --- | --- | --- | --- | --- |
| | 50 | 37.5 | 25.0 | 19 | 9.5 | 4.75 | 2.36 | 2.0 | 0.425 | 0.075 |
| Weight Passing % | | | | 100 | | 75 | | 46 | 28 | 19 |

3. As base layer to the frames—A 15 cm stretch of 10×3 meters of quarry waste aggregate was shaped and compacted.
4. A small concrete mixer (Capacity of about 0.25 m³)
5. A self-loading medium concrete mixer (Capacity of about 5 m³)
6. A few 10 liter water tanks
7. A plastic bucket
8. Scales
9. Rakes and shovels Process:
1. All materials were added based on weight including when using the self-loading concrete mixer (adding order of materials is listed in the table 2 below).
2. 6 Samples were made using the small concrete mixer (5 and 7 cm)
3. 3 samples were made using the medium size concrete mixer.
4. Compacted base was well wetted before pouring the mix in the frames.
5. The concrete mix was poured into the frames and leveled using flat wood.
6. One of each samples was not cured, one was cured for 24 hours and one was cured for 3 days (72 hours). Curing was done by covering with a plastic sheet.

Mixing and Results:

TABLE 2

| Sample No./ Height | First added | Second added | Third Added | Remarks |
| --- | --- | --- | --- | --- |
| 1 5 cm | Quarry waste 125 Kg | Binder 3 12.5 Kg | Water 23 Kg | A bit dry less easy to work with. Not cured. Transverse cracks the next day. |
| 2 5 cm | Water 23 Kg | Quarry waste 125 Kg | Binder 3 12.5 Kg | Good workability. Cured for one day. A few longitudinal cracks. Nice smooth surface. |
| 3 5 cm | Water 23 Kg | Quarry waste 125 Kg | Binder 3 12.5 Kg | Good workability. Cured for three days. A few longitudinal cracks. Nice smooth surface. |
| 4 7.5 cm | Water 23 Kg | Quarry waste 125 Kg | Binder 3 12.5 Kg | Very good workability easy to smoothen. Not cured. Very few longitudinal cracks. |
| 5 7.5 cm | Water 23 Kg | Binder 3 12.5 Kg | Quarry waste 125 Kg | Change in order of adding materials to the mix. Cured for one day. Very good workability. Some cracks in a small portion that was added in a separate mix. |

TABLE 2-continued

| Sample No./ Height | First added | Second added | Third Added | Remarks |
|---|---|---|---|---|
| 6 7.5 cm 7 10 cm 8 10 cm 9 10 cm | Water 23 Kg Water 270 Kg | Binder 3 12.5 Kg Quarry waste 1250 Kg | Quarry waste 125 Kg Binder 3 125 Kg | Good workability. Cured for three days. No cracks at all. Mixed in the large mixer. Used on-mixer Scale to fill quarry waste. The mix was on the wet side. All samples cracked but the least cracks were observed in the sample that was cured for three days. |

As can be seen from the table, improved workability is achieved when water is added first. There is no clear preference between adding the binder second and the quarry waste third or the opposite. Samples that were not cured at all (1, 4 & 7) cracked. Samples that were cured for 1 or 3 days (2, 3, 5, 6, 8 & 9) developed minor surface cracking and some did not at all. Accordingly, curing is a must.

Example 3—Slip Resistance

Sample 6 (from example 2) was tested for slip resistance using a ramp test.

The results were a 42.3° angle and an R13 rating.

R13 is the highest rating on the scale and indicates being the least slippery. The slip resistance results of sample 6 comply with the requirements of the Israeli standard SI 1918 Part 1 Accessibility of the built environment: Principles and general requirements.

Example 4—Embodied $CO_2$

A sidewalk according to embodiments of the current invention was tested for its embodied $CO_2$ in comparison to three other sidewalk compositions.

The concrete composition for the first three typical sidewalks (compositions A-C) was:
Cement=10%
Water=18.5%
Fine aggregate (Sand/crushed rock)=25%
Coarse aggregate (stone gravel)=45%

For composition C (Green) the cement is 50% cement and 50% Slag.

The low carbon emission concrete composition, according to embodiments of the invention, was (composition D):
Binder (36% cements; 40% lime; 24% slag)=8.3%
Water=16.7%
Recycled aggregate=75%

The sidewalk compositions are detailed in table 3:

TABLE 3

| | Composition A | Composition B | Composition C (Green) | Composition D (low carbon emission concrete) |
|---|---|---|---|---|
| Concrete mix design depth | 12 cm | 20 cm | 10 cm | 8 cm |
| Reinforcement 1% volume (7800 kg/m3) | Yes | Yes | — | — |
| Geotextile (density 910 kg/m3) | Yes | Yes | Yes | — |
| Curing compound | Yes | Yes | Yes | — |
| Basecourse aggregate depth | 15 cm | 20 cm | 15 cm | 15 cm |

Table 4 compares the amount of embodied $CO_2$ in the current invention comparison to three other sidewalk compositions. The components of the sidewalks were each tested separately in relation to square meter section of a sidewalk. Column two lists the embodied $CO_2$ per kg of the relevant material. For each sidewalk composition, the first column lists the weight of the material used for one square meter section of a sidewalk and the second lists the embodied $CO_2$ in that section. For example, 28.8 kg of cement is needed for one square meter section of a sidewalk A, and it embodies 24.77 kg of $CO_2$.

As can be seen from the table, the embodied $CO_2$ is much lower for the low carbon emission concrete sidewalk of embodiments of the invention compared to the other sidewalks.

TABLE 4

| | Embodied | Concrete Sidewalk A (12 cm concrete, 15 aggregate, rebar, textile) | | Concrete Sidewalk B (20 cm concrete, 20 aggregate, rebar, textile) | | Green sidewalk (10 cm concrete, 15 cm aggregate, no rebar, textile) | | Low carbon emission concrete 8 cm, 15 cm aggregate, no rebar, no textile) | |
|---|---|---|---|---|---|---|---|---|---|
| Raw material | CO2 (Kg/Kg) | Kg/m2 sidewalk | Kg CO2 | Kg/m2 sidewalk | Kg CO2 | Kg/m2 sidewalk | Kg CO2 | Kg/m2 sidewalk | Kg CO2 |
| Cement Type 1 | 0.860 | 28.8 | 24.77 | 48 | 41.28 | 12 | 10.32 | | |
| Novel Binder | 0.545 | | | | | | | 15.94 | 8.69 |
| Slag | 0.0796 | | | | | 12 | 0.955 | | |
| Rebar | 0.412 | 9.36 | 3.86 | 15.6 | 6.43 | | | | |
| Water | 0.0033 | 24 | 0.079 | 32 | 1.056 | 20 | 0.066 | 13.36 | 0.0445 |
| Geotextile | 2.280 | 0.819 | 1.87 | 1.365 | 3.11 | 0.819 | 1.87 | | |
| Concrete aggregate | 0.0026 | 184.8 | 0.48 | 308 | 0.801 | 154 | 0.40 | | |

TABLE 4-continued

|  | Embodied | Concrete Sidewalk A (12 cm concrete, 15 aggregate, rebar, textile) | | Concrete Sidewalk B (20 cm concrete, 20 aggregate, rebar, textile) | | Green sidewalk (10 cm concrete, 15 cm aggregate, no rebar, textile) | | Low carbon emission concrete 8 cm, 15 cm aggregate, no rebar, no textile) | |
|---|---|---|---|---|---|---|---|---|---|
| Raw material | $CO_2$ (Kg/Kg) | Kg/m2 sidewalk | Kg $CO_2$ | Kg/m2 sidewalk | Kg $CO_2$ | Kg/m2 sidewalk | Kg $CO_2$ | Kg/m2 sidewalk | Kg $CO_2$ |
| Aggregate layer | 0.0026 | 330 | 0.858 | 440 | 1.144 | 330 | 0.858 | 330 | 0.858 |
| Recycled waste aggregate | 0 | | | | | | | 132 | 0 |
| TOTAL | | | 39.00 | | 53.03 | | 14.30 | | 9.59 |

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A low carbon emission concrete mixture consisting essentially of: a hydraulic binder, an aggregate mix and water; wherein the hydraulic binder comprises: cements, 30%-50% w/w lime, and slag.

2. The concrete mixture of claim 1, consisting essentially of: 5-30% w/w hydraulic binder, 40-80% w/w aggregate mix and 5-40% w/w water.

3. The concrete mixture of claim 1, wherein the aggregate mix includes rock quarry waste.

4. The concrete mixture of claim 3, wherein the gradation of the aggregate mix includes: coarse sand: 9%-16% w/w, fine sand: 8%-15% w/w, silt-clay: 25%-35% w/w and clay: 13%-20% w/w.

5. The concrete mixture of claim 1, wherein the hydraulic binder further comprises monofilament polypropylene fibers.

6. The concrete mixture of claim 5, wherein the hydraulic binder comprises 30-40% w/w cements, 20-30% w/w slag and 0.001-1% w/w monofilament polypropylene fibers.

7. The concrete mixture of claim 1, wherein the hydraulic binder comprises 30-40% w/w cements and 20-30% w/w slag.

8. The concrete mixture of claim 1, wherein the cements comprise-white cement and Ordinary Portland Cement (OPC).

9. A concrete rigid walkway comprising a base layer of compacted course aggregate and a top layer comprising the concrete mixture of claim 1, wherein the base layer is in direct contact with the top layer.

10. The concrete rigid walkway of claim 9, wherein the depth of the top layer is between 5-8 cm.

11. A method of constructing a low carbon emission concrete rigid walkway, consisting essentially of:
shaping, wetting and compacting of local natural ground;
shaping, compacting and wetting aggregate, to produce an aggregate base layer;
pouring a low carbon emission concrete mixture over the aggregate base layer to produce a top layer; wherein the low carbon emission concrete mixture comprises: a hydraulic binder, an aggregate mix and water; wherein the hydraulic binder comprises: cements, 30%-50% w/w lime and slag;
curing the top layer to produce the low carbon emission concrete rigid walkway.

12. The method of claim 11, wherein the base layer is in direct contact with the top layer.

13. The method of claim 11, wherein the curing comprises covering the top layer with plastic sheet.

14. The method of claim 11, wherein the curing duration is between 48-96 hours.

15. A hydraulic binder consisting essentially of: cements, 30%-50% w/w lime, slag, and monofilament polypropylene fibers.

16. The hydraulic binder of claim 15, comprising 30-40% w/w cements, and 20-30% w/w slag.

17. The hydraulic binder of claim 15, comprising 30-40% w/w cements, and 20-30% w/w slag, and 0.001-1% w/w monofilament polypropylene fibers.

18. The hydraulic binder of claim 15, wherein the cements comprise-white cement and Ordinary Portland Cement (OPC).

19. The hydraulic binder of claim 18, wherein the ratio of white cement and OPC is 1:0.8.

* * * * *